US009992124B2

(12) United States Patent
Seely et al.

(10) Patent No.: US 9,992,124 B2
(45) Date of Patent: Jun. 5, 2018

(54) MULTI-CHANNEL DECODER ARCHITECTURE

(71) Applicant: ITRON, INC., Liberty Lake, WA (US)

(72) Inventors: Danny Ray Seely, Spokane Valley, WA (US); Michael David McNamee, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 58 days.

(21) Appl. No.: 14/879,262

(22) Filed: Oct. 9, 2015

(65) Prior Publication Data

US 2017/0104684 A1    Apr. 13, 2017

(51) Int. Cl.
| | |
|---|---|
| *H04B 7/02* | (2017.01) |
| *H04L 12/851* | (2013.01) |
| *H04B 1/06* | (2006.01) |
| *H04W 52/02* | (2009.01) |

(52) U.S. Cl.
CPC .......... *H04L 47/2483* (2013.01); *H04B 1/06* (2013.01); *H04L 47/245* (2013.01); *H04W 52/0229* (2013.01); *H04W 52/0258* (2013.01); *Y02B 60/50* (2013.01)

(58) Field of Classification Search
CPC ............... H04W 72/082; H04W 88/08; H04W 72/0453; H04W 72/04; H04W 4/00
See application file for complete search history.

(56) References Cited

U.S. PATENT DOCUMENTS

| | | | |
|---|---|---|---|
| 4,455,649 A | 6/1984 | Esteban et al. | |
| 5,377,227 A | 12/1994 | Hurlbut et al. | |
| 5,408,524 A * | 4/1995 | Reum ................... | H04M 15/28 370/523 |
| 5,577,031 A | 11/1996 | Smith | |

(Continued)

FOREIGN PATENT DOCUMENTS

| | | |
|---|---|---|
| CN | 102332942 A | 1/2012 |
| EP | 1024621 A2 | 8/2000 |

(Continued)

OTHER PUBLICATIONS

Canadian Office Action dated Aug. 1, 2016, for Canadian Patent Application No. 2902532, 3 pages.

(Continued)

*Primary Examiner* — Edan Orgad
*Assistant Examiner* — Emmanuel Maglo

(57) ABSTRACT

An example method of receiving a data packet includes receiving a data packet at a channel receiver of at least one channel receiver each associated with a channel, providing the data packet to a data packet identification block that corresponds to the channel receiver, validating the data packet at the data packet identification block, and providing the validated data packet to an available decoder block of at least one decoder block capable of performing one or more decoding functions, where a quantity of the decoder blocks is less than a quantity of the data packet identification blocks and optimized according to one or more goals. If no decoder block is available and the validated data packet is a higher (Continued)

priority data packet, a decoder block processing a lower priority data packet may be forced to stop processing the lower priority data packet and process the higher priority data packet.

24 Claims, 12 Drawing Sheets

(56) References Cited

U.S. PATENT DOCUMENTS

| | | | |
|---|---|---|---|
| 5,809,422 A | 9/1998 | Raleigh et al. | |
| 5,815,117 A * | 9/1998 | Kolanek | G01S 3/043 |
| | | | 342/442 |
| 5,832,249 A | 11/1998 | Tran et al. | |
| 5,920,589 A | 7/1999 | Rouquette et al. | |
| 5,991,349 A * | 11/1999 | Chen | H04L 7/0334 |
| | | | 375/346 |
| 6,128,276 A * | 10/2000 | Agee | H04B 1/692 |
| | | | 370/208 |
| 6,141,373 A | 10/2000 | Scott | |
| 6,205,319 B1 * | 3/2001 | Wiswell | H04B 7/04 |
| | | | 455/12.1 |
| 6,230,026 B1 * | 5/2001 | Schwaller | H04B 1/713 |
| | | | 370/337 |
| 6,253,060 B1 | 6/2001 | Komara et al. | |
| 6,282,184 B1 * | 8/2001 | Lehman | H04B 1/0003 |
| | | | 370/278 |
| 6,339,694 B1 | 1/2002 | Komara et al. | |
| 6,347,120 B1 | 2/2002 | Sakoda | |
| 6,445,685 B1 | 9/2002 | Carrozza et al. | |
| 6,526,532 B1 | 2/2003 | Cinkler et al. | |
| 6,535,502 B1 | 3/2003 | Brink | |
| 6,798,850 B1 | 9/2004 | Wedin et al. | |
| 6,798,853 B1 | 9/2004 | Lindbom et al. | |
| 6,830,523 B1 | 12/2004 | Kuhn | |
| 6,850,774 B1 | 2/2005 | Cashman | |
| 6,910,979 B2 | 6/2005 | Barrie et al. | |
| 6,935,976 B1 | 8/2005 | Grace, Jr. et al. | |
| 6,947,500 B1 | 9/2005 | Carrozza et al. | |
| 6,985,545 B2 | 1/2006 | Teo et al. | |
| 7,091,854 B1 | 8/2006 | Miao | |
| 7,248,189 B2 | 7/2007 | Sinha et al. | |
| 7,430,254 B1 | 9/2008 | Anderson | |
| 7,466,743 B2 | 12/2008 | Naguib | |
| 7,483,483 B2 | 1/2009 | Lakkis | |
| 7,548,579 B1 | 6/2009 | Murphy et al. | |
| 7,555,060 B2 * | 6/2009 | Raleigh | H04B 7/0615 |
| | | | 375/260 |
| 7,713,151 B2 | 5/2010 | Fulton | |
| 7,742,547 B2 | 6/2010 | Lin et al. | |
| 7,787,835 B2 | 8/2010 | Kato | |
| 7,912,028 B2 | 3/2011 | Arviv et al. | |
| 7,936,851 B2 | 5/2011 | Renfors et al. | |
| 7,986,711 B2 | 7/2011 | Horvath et al. | |
| 8,045,654 B1 | 10/2011 | Anderson | |
| 8,128,521 B1 | 3/2012 | Ulmer | |
| 8,175,114 B2 | 5/2012 | Shiizaki et al. | |
| 8,197,367 B2 | 6/2012 | Pulkrabek et al. | |
| 8,325,704 B1 | 12/2012 | Lemkin et al. | |
| 8,345,588 B2 | 1/2013 | Adachi et al. | |
| 8,514,982 B2 | 8/2013 | Dubash et al. | |
| 8,913,701 B2 | 12/2014 | Seely | |
| 8,934,532 B2 | 1/2015 | Seely | |
| 8,958,506 B2 | 2/2015 | Seely | |
| 9,014,307 B2 | 4/2015 | Seely | |
| 9,077,487 B2 | 7/2015 | Seely et al. | |
| 9,077,577 B1 * | 7/2015 | Ashrafi | H04L 27/362 |
| 9,252,998 B2 | 2/2016 | Seely | |
| 9,426,680 B2 | 8/2016 | Seely et al. | |
| 2002/0090915 A1 | 7/2002 | Komara et al. | |
| 2002/0106009 A1 | 8/2002 | Harrison | |
| 2002/0118784 A1 | 8/2002 | Teo et al. | |
| 2002/0188723 A1 | 12/2002 | Choi et al. | |
| 2003/0060204 A1 | 3/2003 | Francl et al. | |
| 2003/0076899 A1 | 4/2003 | Kumar et al. | |
| 2004/0032825 A1 | 2/2004 | Halford et al. | |
| 2004/0042557 A1 * | 3/2004 | Kabel | H03H 17/0266 |
| | | | 375/260 |
| 2004/0152418 A1 | 8/2004 | Sinha et al. | |
| 2004/0246994 A1 | 12/2004 | Munoz et al. | |
| 2005/0005225 A1 * | 1/2005 | Johnson | H03M 13/1515 |
| | | | 714/758 |
| 2005/0122895 A1 | 6/2005 | Zhou et al. | |
| 2005/0156775 A1 | 7/2005 | Petre et al. | |
| 2005/0201450 A1 | 9/2005 | Volpi et al. | |
| 2005/0259724 A1 | 11/2005 | Bergstrom et al. | |
| 2005/0259755 A1 | 11/2005 | Tomasin et al. | |
| 2005/0281321 A1 | 12/2005 | Bergstrom et al. | |
| 2005/0289623 A1 | 12/2005 | Midani et al. | |
| 2007/0067376 A1 | 3/2007 | Noga | |
| 2007/0069864 A1 | 3/2007 | Bae et al. | |
| 2007/0097942 A1 | 5/2007 | Gorokhov et al. | |
| 2007/0286311 A1 * | 12/2007 | Coyne | H04L 5/06 |
| | | | 375/340 |
| 2007/0291829 A1 | 12/2007 | Nabetani et al. | |
| 2008/0001779 A1 | 1/2008 | Cahill-O'Brien et al. | |
| 2008/0233954 A1 | 9/2008 | Ibrahim et al. | |
| 2009/0131113 A1 | 5/2009 | Shiizaki et al. | |
| 2009/0247179 A1 | 10/2009 | Bell et al. | |
| 2009/0296852 A1 | 12/2009 | Kobayashi | |
| 2009/0316841 A1 * | 12/2009 | Li | H04L 1/0045 |
| | | | 375/346 |
| 2010/0091777 A1 * | 4/2010 | Cannon | H04L 1/0071 |
| | | | 370/392 |
| 2010/0103901 A1 | 4/2010 | Miki et al. | |
| 2010/0142723 A1 | 6/2010 | Bucklen | |
| 2010/0150037 A1 * | 6/2010 | Becker | H04B 7/18504 |
| | | | 370/310 |
| 2010/0172452 A1 | 7/2010 | Tota | |
| 2010/0177645 A1 | 7/2010 | Kang et al. | |
| 2010/0188286 A1 | 7/2010 | Bickerstaff et al. | |
| 2010/0265095 A1 | 10/2010 | Cornwall et al. | |
| 2010/0328527 A1 | 12/2010 | Brandsma et al. | |
| 2011/0002322 A1 | 1/2011 | Kim et al. | |
| 2011/0013581 A1 | 1/2011 | Lee et al. | |
| 2011/0026425 A1 | 2/2011 | Picard | |
| 2011/0039495 A1 | 2/2011 | Sawai et al. | |
| 2011/0058524 A1 | 3/2011 | Hart et al. | |
| 2011/0075641 A1 * | 3/2011 | Siriwongpairat | B61L 27/0005 |
| | | | 370/337 |
| 2011/0090059 A1 | 4/2011 | Sadr | |
| 2011/0116361 A1 | 5/2011 | Kobayashi et al. | |
| 2011/0134868 A1 | 6/2011 | Lee et al. | |
| 2011/0176479 A1 | 7/2011 | Booton et al. | |
| 2011/0188607 A1 | 8/2011 | Suominen et al. | |
| 2011/0194514 A1 | 8/2011 | Lee et al. | |
| 2011/0228712 A1 | 9/2011 | Anderson | |
| 2011/0255577 A1 | 10/2011 | Agee et al. | |
| 2011/0285572 A1 | 11/2011 | Alon | |
| 2012/0033643 A1 | 2/2012 | Noh et al. | |
| 2012/0063554 A1 | 3/2012 | Smith | |
| 2012/0163508 A1 | 6/2012 | Kuffner et al. | |
| 2012/0165142 A1 | 6/2012 | Grace | |
| 2012/0189084 A1 * | 7/2012 | Yu | H04L 5/06 |
| | | | 375/340 |
| 2012/0195257 A1 * | 8/2012 | Hahm | H04L 1/0041 |
| | | | 370/328 |
| 2012/0195282 A1 | 8/2012 | Choi et al. | |
| 2012/0213514 A1 | 8/2012 | Yu | |
| 2012/0224612 A1 | 9/2012 | Kim et al. | |
| 2012/0269151 A1 | 10/2012 | Lee et al. | |
| 2012/0270537 A1 | 10/2012 | Weng et al. | |
| 2012/0275423 A1 | 11/2012 | Hart et al. | |
| 2012/0294397 A1 | 11/2012 | Umeda et al. | |
| 2013/0004180 A1 | 1/2013 | Gupta et al. | |
| 2013/0017794 A1 | 1/2013 | Kloper et al. | |
| 2013/0030931 A1 | 1/2013 | Moshfeghi | |
| 2013/0058380 A1 | 3/2013 | Kim et al. | |
| 2013/0077505 A1 | 3/2013 | Choudhary et al. | |
| 2013/0107813 A1 | 5/2013 | Siriwongpairat et al. | |
| 2013/0107849 A1 | 5/2013 | Park | |
| 2013/0114763 A1 | 5/2013 | Park | |

(56) References Cited

U.S. PATENT DOCUMENTS

| | | | |
|---|---|---|---|
| 2013/0201406 A1 | 8/2013 | Ling et al. | |
| 2013/0201972 A1 | 8/2013 | Alexander et al. | |
| 2013/0215932 A1 | 8/2013 | Shuey et al. | |
| 2013/0235914 A1 | 9/2013 | Duenyas | |
| 2013/0244673 A1 | 9/2013 | Anand et al. | |
| 2013/0251073 A1 | 9/2013 | Suominen | |
| 2013/0266083 A1 | 10/2013 | Baik et al. | |
| 2013/0272453 A1 | 10/2013 | Gupta | |
| 2013/0272698 A1* | 10/2013 | Jin | H04L 27/2628 398/43 |
| 2013/0294445 A1* | 11/2013 | Chase | H04Q 11/04 370/357 |
| 2014/0101354 A1 | 4/2014 | Liu et al. | |
| 2014/0185552 A1 | 7/2014 | Lee et al. | |
| 2014/0206367 A1* | 7/2014 | Agee | H04W 28/0236 455/450 |
| 2014/0241178 A1 | 8/2014 | Seely et al. | |
| 2014/0241468 A1 | 8/2014 | Seely | |
| 2014/0241469 A1 | 8/2014 | Seely et al. | |
| 2014/0241472 A1 | 8/2014 | Seely | |
| 2014/0242922 A1 | 8/2014 | Seely | |
| 2014/0242931 A1 | 8/2014 | Seely | |
| 2014/0242936 A1 | 8/2014 | Seely | |
| 2015/0139348 A1* | 5/2015 | Tong | H04B 7/068 375/267 |
| 2016/0204823 A1* | 7/2016 | Lovberg | H04B 1/40 375/219 |
| 2016/0337891 A1 | 11/2016 | Seely | |
| 2016/0373158 A1* | 12/2016 | Ardalan | H04B 7/043 |
| 2017/0104684 A1* | 4/2017 | Seely | H04B 1/06 |

FOREIGN PATENT DOCUMENTS

| | | |
|---|---|---|
| EP | 2348649 A2 | 7/2011 |
| WO | 9528041 A1 | 10/1995 |
| WO | 2008018755 A1 | 2/2008 |
| WO | 2009055770 A1 | 4/2009 |
| WO | 2009121045 A2 | 10/2009 |
| WO | 2010053967 A1 | 5/2010 |

OTHER PUBLICATIONS

Canadian Office Action dated Aug. 1, 2016, for Canadian Patent Application No. 2902539, 3 pages.
Canadian Office Action dated Aug. 2, 2016, for Canadian Patent Application No. 2902537, 3 pages.
Canadian Office Action dated Aug. 25, 2016, for Canadian Patent Application No. 2902536, 3 pages.
Canadian Office Action dated Aug. 26, 2016, for Canadian Patent Application No. 2902534, 3 pages.
Canadian Office Action dated Jul. 29, 2016, for Canadian Patent Application No. 2902527, 3 pages.
Canadian Office Action dated Jul. 29, 2016, for Canadian Patent Application No. 2902551, 3 pages.
Canadian Office Action dated Jul. 5, 2017, for Canadian Patent Application No. 2902527, 3 pages.
Canadian Office Action for Canadian Patent Application No. 2944296, dated Aug. 14, 2017, 3 pages.
Extended European Search Report dated Mar. 2, 2017, for European Patent Application No. 16192918.7, 7 pages.
Final Office Action dated Apr. 25, 2014, for U.S. Appl. No. 13/776,476, 8 pages.
Final Office Action dated Jan. 28, 2015, for U.S. Appl. No. 13/776,528, 28 pages.
Final Office Action dated Mar. 20, 2015, for U.S. Appl. No. 13/776,575, 21 pages.
Final Office Action dated May 9, 2014, for U.S. Appl. No. 13/776,505, 14 pages.
Final Office Action dated Nov. 7, 2014, for U.S. Appl. No. 13/776,562, 16 pages.
Notice of Allowance dated Apr. 13, 2016, for U.S. Appl. No. 13/776,528, 11 pages.
Notice of Allowance dated Aug. 12, 2014, for U.S. Appl. No. 13/776,476, 5 pages.
Notice of Allowance dated Dec. 23, 2014, for U.S. Appl. No. 13/776,548, 10 pages.
Notice of Allowance dated Mar. 2, 2015, for U.S. Appl. No. 13/776,562, 9 pages.
Notice of Allowance dated Oct. 10, 2017, for U.S. Appl. No. 15/222,519, 17 pages.
Notice of Allowance dated Oct. 2, 2014, for U.S. Appl. No. 13/776,587, 8 pages.
Notice of Allowance dated Sep. 18, 2015, for U.S. Appl. No. 13/776,575, 8 pages.
Notice of Allowance dated Sep. 3, 2014, for U.S. Appl. No. 13/776,505, 8 pages.
Office Action dated Apr. 24, 2014, for U.S. Appl. No. 13/776,562, 9 pages.
Office Action dated Aug. 29, 2014, for U.S. Appl. No. 13/776,575, 16 pages.
Office Action dated Dec. 13, 2013, for U.S. Appl. No. 13/776,476, 10 pages.
Office Action dated May 6, 2014, for U.S. Appl. No. 13/776,587, 6 pages.
Office Action dated Nov. 23, 2015, for U.S. Appl. No. 13/776,528, 37 pages.
Office Action dated Sep. 11, 2014, for U.S. Appl. No. 13/776,528, 24 pages.
Office Action dated Sep. 19, 2014, for U.S. Appl. No. 13/776,548, 14 pages.
Office Action dated Dec. 2, 2013, for U.S. Appl. No. 13/776,505, 10 pages.
PCT International Search Report and Written Opinion dated Aug. 4, 2014, for PCT Application No. PCT/US2014/018408, 16 pages.
PCT International Search Report and Written Opinion dated Aug. 4, 2014, for PCT Application No. PCT/US2014/018436, 18 pages.
PCT International Search Report and Written Opinion dated Jun. 16, 2014, for PCT Application No. PCT/US2014/018413, 11 pages.
PCT International Search Report and Written Opinion dated Jun. 16, 2014, for PCT Application No. PCT/US2014/018423, 13 pages.
PCT International Search Report and Written Opinion dated Jun. 16, 2014, for PCT Application No. PCT/US2014/018429, 9 pages.
PCT International Search Report and Written Opinion dated Jun. 16, 2014, for PCT Application No. PCT/US2014/018433, 14 pages.
Communication Pursuant to Article 94(3) EPC dated Jan. 25, 2018, for European Patent Application No. 14710455.8, 6 pages.
Communication Pursuant to Article 94(3) EPC dated Jan. 25, 2018 for European Patent Application No. 14710452.5; 7 pages.
Communication Pursuant to Article 94(3) EPC, dated Apr. 17, 2018, for European Patent Application No. 14711865.7, 5 pages.
Communication Pursuant to Article 94(3) EPC, dated Mar. 29, 2018, for European Patent Application No. 14710456.6, 7 pages.
Communication Pursuant to Article 94(3) EPC dated Mar. 29, 2018, for European Patent Application No. 14710457.4, 6 pages.
Communication Pursuant to Article 94(3) EPC dated Apr. 23, 2018, for European Patent Application No. 14710458.2, 7 pages.
Communication Pursuant to Article 94(3) EPC dated Apr. 23, 2018, for European Patent Application No. 14713956.2, 5 pages.

* cited by examiner

MULTI-CHANNEL DECODER ARCHITECTURE

FIELD OF THE DISCLOSURE

This disclosure relates generally to communication systems, and, more particularly, to communication systems involving multi-channel receivers.

BACKGROUND

Narrowband long-range modes to be utilized in future networks may allow for extremely large channel plans. Utilizing many narrowband channels will allow better spectrum utilization and may offer a higher probability of finding clean spectrum. One challenge with implementing a multi-channel receiver is finding a viable solution for large parallel channel configurations. Power savings is of great importance in communication solutions, yet power dissipation constraints make large channel plans extremely difficult to implement.

Figure 1:
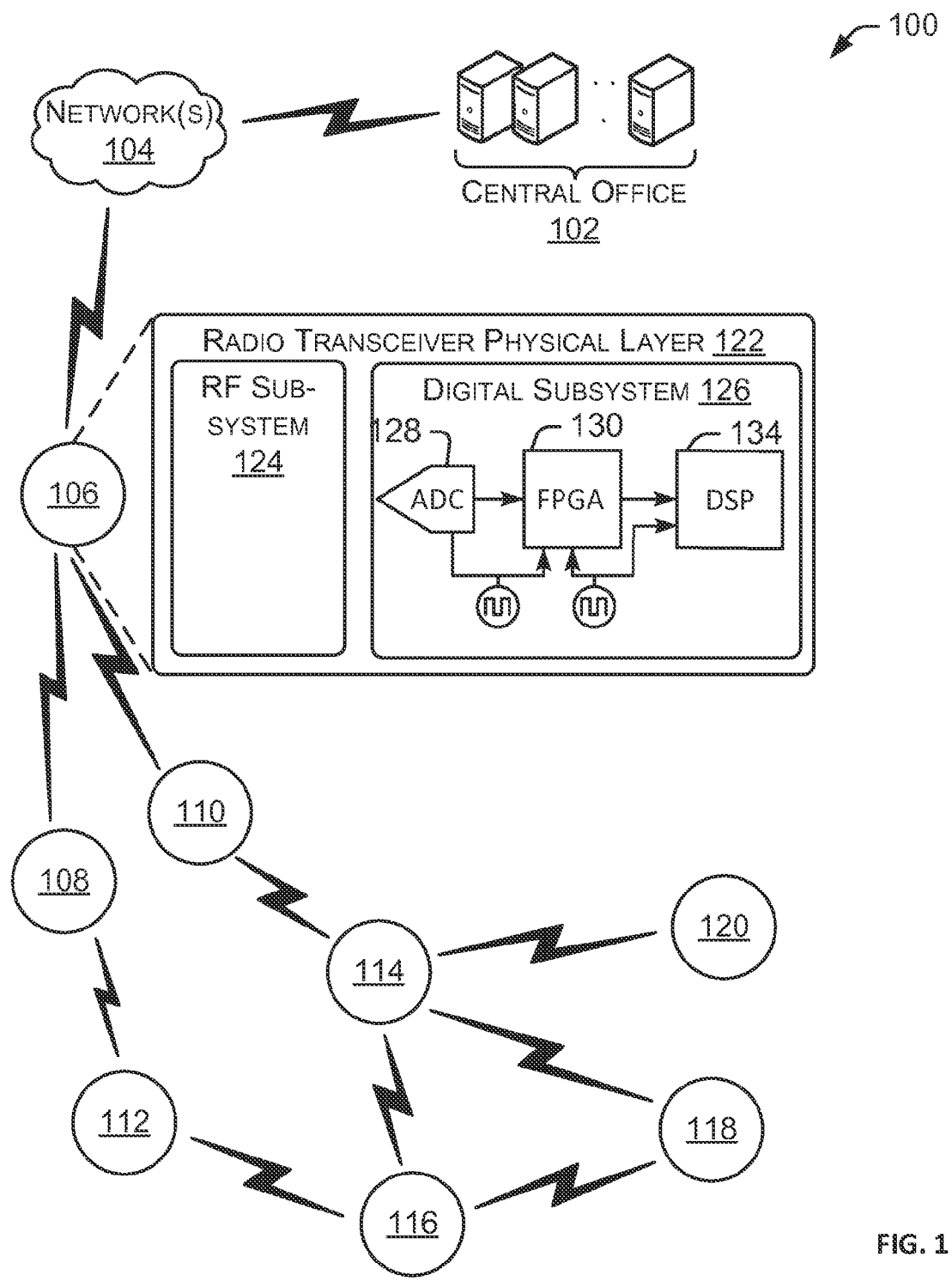
FIG. 1 is a schematic illustration of an environment in which example methods, apparatus, and articles of manufacture disclosed herein may be implemented.

In the drawings, the leftmost digit(s) of a reference number may identify the drawing in which the reference number first appears.

DETAILED DESCRIPTION

Current radio frequency (RF) receiver architectures may include a channelizing unit and a bank of decoders. A channelizing unit, or channelizer, is responsible for taking a received RF band and breaking it into parallel paths aligned with a desired channel path. These paths then connect to a bank of decoders, enabling simultaneous reception on all of the channels. A significant amount of the power dissipated by a receiver is used in the decoder bank. The current architecture includes a decoder on each path to guarantee reliable reception on any channel. However, it can be shown that only a small subset of channels (and therefore only a small subset of decoders) may be active at any given instant. The following description discloses technology in which a large multi-channel receiver can efficiently be implemented while significantly reducing the number of expensive components used in the decoder bank (e.g., FPGA resources, etc.) and the amount of power dissipation by optimizing the decoder bank and how it is used.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

FIG. 1 illustrates an RF network 100 (e.g., an advanced meter reading (AMR) network or other similar network) that utilizes a radio having one or more of the features and techniques discussed herein. The network 100 may include a central office 102, which may be associated with a data processing entity (e.g., a utility company in the case of an AMR network). The central office may communicate through a network 104, which may be the Internet or other network having widespread or local functionality. A data collector and/or concentrator 106 may be configured with a radio for RF communication with a plurality of downstream devices. In the example shown, a plurality of network nodes, such as endpoints 108-120 may be configured in a mesh network, star network or other configuration. One or more of the endpoints 108-120 may be configured for RF communication with the data collector 106. In an example operation, the data collector 106 may receive data or other communications from the endpoints 108-120. For example, for an AMR network, the data may include consumption information associated with an electric, gas or water meter. Additionally, the data collector 106 may send software updates, firmware updates, instructions or other information to one or more of the endpoints 108-120. While in this example, a data collector is shown as a network node, in other embodiments, the data collector may be located at the central office and/or may be embodied in a mobile data collection device.

In an expanded view, aspects of a radio of data collector 106 are shown. In particular, a simplified block diagram shows an example radio receiver physical layer 122. The radio may be used for any desired purpose, such as communication with the plurality of endpoints 108-120. An RF subsystem or front end 124 may provide an analog signal covering an entire radio band to a digital subsystem 126. The analog signal may be provided in the time domain. An analog to digital converter (ADC) 128 may be in the RF subsystem 124, the digital subsystem 126 or between the two. For purposes of illustrative clarity, only the receive structures and/or functionality are shown; however, analogous transmit functions may also be present. In the example shown, a variety of functional blocks are indicated in the digital subsystem 126, including ADC 128 and a field programmable gate array (FPGA) 130. While an FPGA is shown, an application specific integrated circuit (ASIC) and/or other logic device may be used. The FPGA may be in communication with (or combined with) a digital signal processor (DSP).

In one example of operation, the digital subsystem 126 receives a down-converted and filtered signal from RF subsystem 124, which contains information representative of an entire radio band of interest. Filtering provided by the RF subsystem 124 attenuates signals outside the radio band to prevent any aliased products from interfering with the targeted received signals. The digital subsystem 126 may sample intermediate frequency (IF) signals provided by RF subsystem 124 and perform calculations to create parallel RF channels of incoming signal data. In one example, ADC 128 converts the analog signal into a sampled digital representation. The FPGA 130 receives the digital representation, and channelizes and re-samples it into discrete channels. The FPGA 130 may also provide a correlating detector to identify known preamble signatures (e.g., a synchronization word (or sync-word)) in an incoming data packet to identify and validate the data packet. The decoding capability of the digital subsystem 126 (which may be located in FPGA 130) detects, identifies, modulates and/or demodulates multiple modulation schemes, e.g., on-off keying (OOK) and/or GFSK modulation. Once correlation is achieved, FPGA 130 then decodes raw samples into bits and passes words (e.g., 16-bit words) to DSP processor 134. The DSP 134 provides packet decoding, cyclic redundancy code (CRC) validation, and if available, forward error correction (FEC) for each successfully detected packet.

Figure 2:
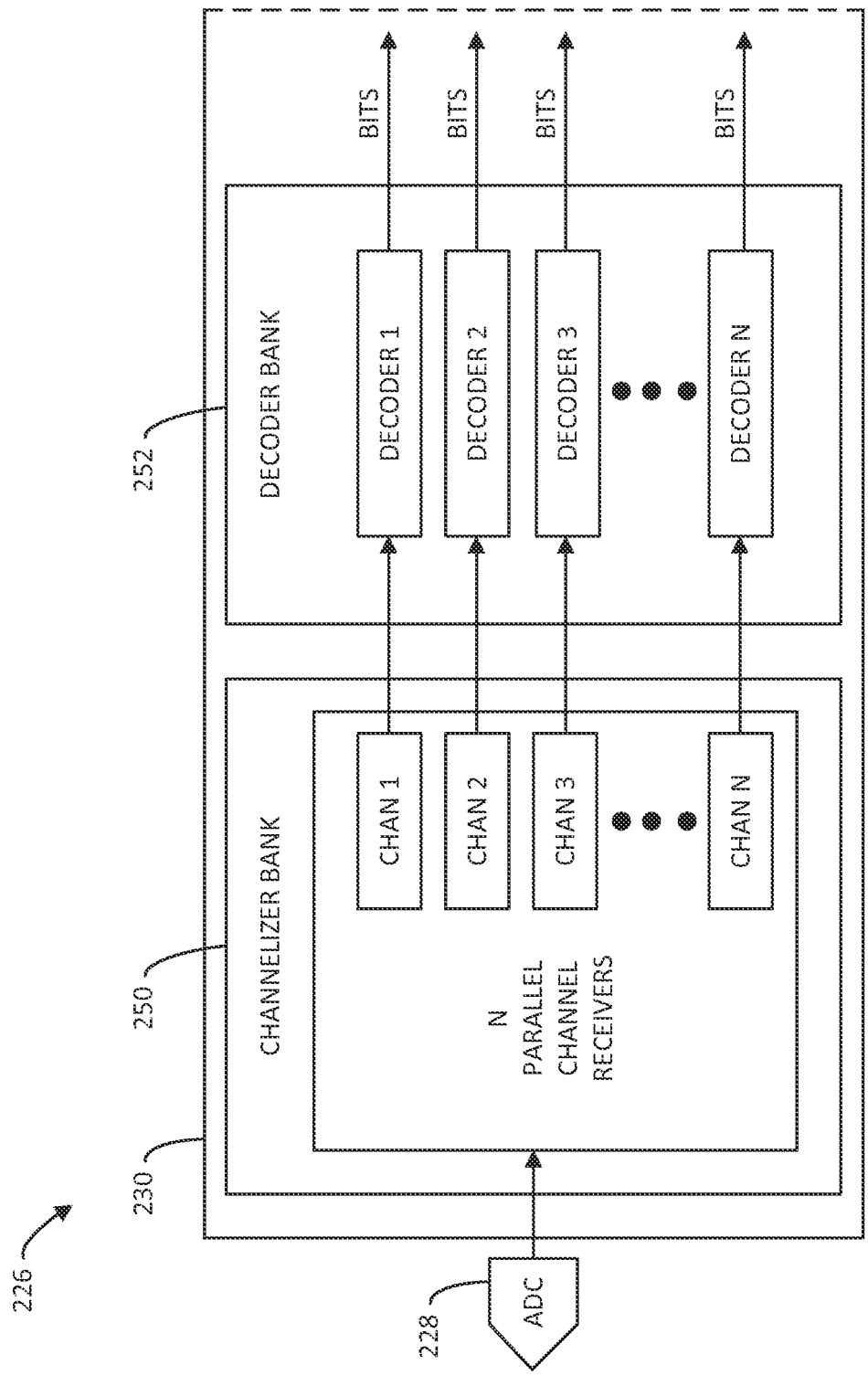
FIG. 2 is a block diagram representative of an example implementation of a radio receiver showing a one-to-one mapping of channels to decoders.

FIG. 2 illustrates an example implementation of a digital subsystem 226 of a radio receiver (such as digital subsystem 126 of FIG. 1). In operation, an ADC 228 may convert an analog signal into a digital representation that is passed to channelizer bank 250 of a logic device 230 (e.g., an FPGA). Channelizer bank 250 channelizes and resamples the digital signal into parallel paths aligned with discrete channels 1-N. Each channel of channels 1-N connects to a respective decoder 1-N of a decoder bank 252 in a one-to-one mapping of channels to decoders. Each decoder may perform detection, identification, and modulation and/or demodulation of one or more multiple modulation schemes. Once correlation is achieved, raw samples may be decoded into bits and words (e.g., 16-bit words) and may be passed to a DSP (not shown) as described above.

Figure 4:
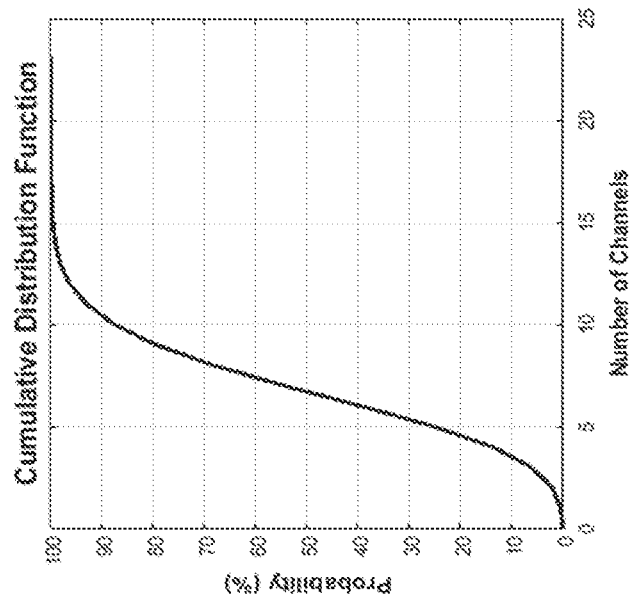
FIGS. 3 and 4 are data plots showing active channel distribution and a corresponding cumulative distribution function, respectively, based on given parameters including a specified number of endpoints.
Figure 3:
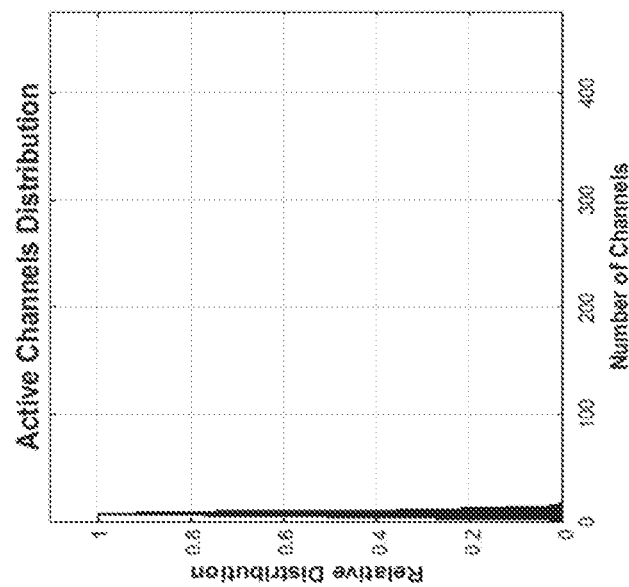

As shown in the example receiver of FIG. 2, there is a one-to-one mapping of channels to decoders. As stated earlier, a significant amount of the power dissipated by a receiver is used in the decoder bank. Thus, it would be desirable to find a way to reduce this power usage in the decoder bank. FIGS. 3 and 4 show the results of a simulation that show that only a small subset of channels may be active at any given instant. In the simulation, the following parameters were used:

Number of endpoints in a cell: 100,000
Number of channels: 476
Transmission (TX) packet length: 400 msec
Bubble-up rate: 90 minutes
Time dithering: 100 msec The bubble-up rate refers to how often an endpoint turns on to provide data. Time dithering refers to forcing random transmission start time to vary for a given bubble-up rate to prevent data collisions due to simultaneous data packet transmissions. The following summarizes the results of the simulation:

Average active channels: 7.4
Standard deviation: 2.7
Number of collisions: 11,650 (0.78%)

and the data is plotted in FIGS. 3 and 4.

FIG. 3 shows the relative distribution of channels that were receiving a packet at any given instant. Even though there were 476 channels available, on average only 7.4 channels were active at any given instant, with a standard deviation of 2.7 channels. FIG. 4 shows the cumulative distribution function (CDF) of this simulation. The results of the simulation show that 99.7% of the time, approximately 15.5 channels are receiving a signal. The simulation also showed that 0.78% of the packets were lost due to collisions (not shown). Therefore, even though there are 476 receiving channels, less than 16 channels (and, therefore, less than 16 decoders) were active 99.7% of the time.

Figure 6:
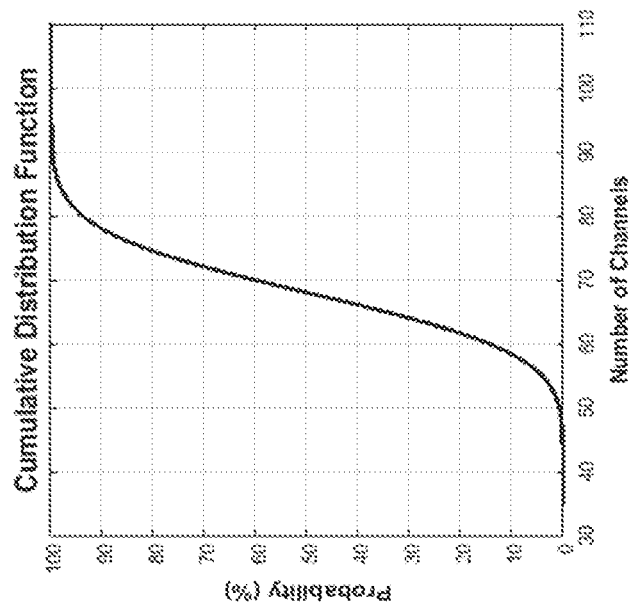
FIGS. 5 and 6 are data plots showing active channel distribution and a corresponding cumulative distribution function, respectively, based on given parameters including a significantly increased number of endpoints from what was used for the plots in FIGS. 3 and 4.
Figure 5:
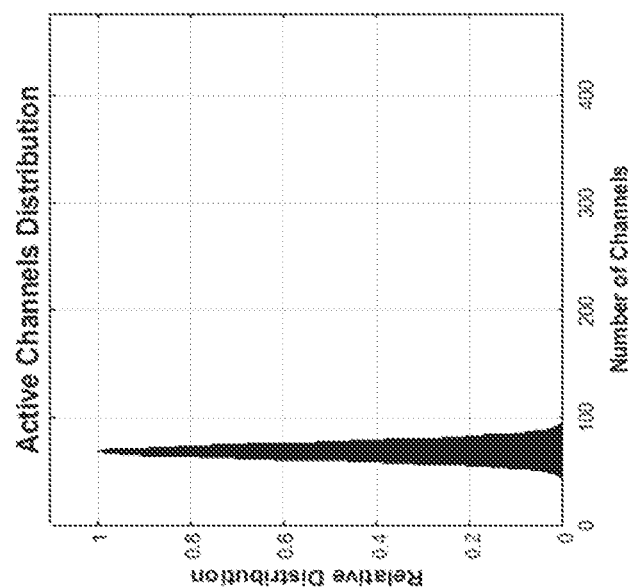

FIGS. 5 and 6 show the results of a similar simulation that further confirms the above results. In this simulation, the same parameter values were used, except that the number of endpoints was increased to 1 million (10 times greater than in the previous simulation). In many types of RF networks, this would likely be considered an extreme case that would rarely, if ever, occur. The results of this simulation were as follows:

Average active channels: 68.6
Standard deviation: 7.6
Number of collisions: 1,109,807 (7.4%)

and the data is plotted in FIGS. 5 and 6. By substantially increasing the number of endpoints, many more packets were lost due to collisions. With a collision rate of 7.4%, the RF spectrum may begin to hit the limits of practical deployment. Even in this extreme scenario, however, the average number of active channels was only 68.6 with a standard deviation of 7.6, which indicates that less than 92 decoders were active 99.7% of the time.

Even though 476 channels were being equally used, these simulations demonstrate that the vast majority of the decoders were inactive most of the time, even under a very extreme scenario. Recognizing this behavior allows for the design of an architecture that can utilize less logic device components (e.g., less FPGA fabric) and thus dissipate considerably less power while having little to no measurable impact on packet reception. Based on the simulation results, one key to a more efficient receiver architecture is to monitor all channels for a desirable signal, but only have sufficient resources to decode those signals. As discussed above, most of the logic device resources (e.g., FPGA resources), and thus power, are consumed by the decoder bank. Typical decoders contain blocks for, for example but not limitation, data packet identification (e.g., sync-word detection), automatic frequency correction (AFC), automatic gain control (AGC), channel filtering, bit detection, data de-whitening, convolutional decoding, etc. However, only the data packet identification block is required for detecting a desirable signal. The amount of power and quantity of components (e.g., fabric) associated with the data packet identification block is typically small relative to other blocks found in a decoder. Thus, it is desirable to minimize the number of decoder blocks, other than data packet identification blocks, that are needed for acceptable use of the receiver (e.g., minimized packet loss), especially for applications involving a large number of channels.

Figure 7:
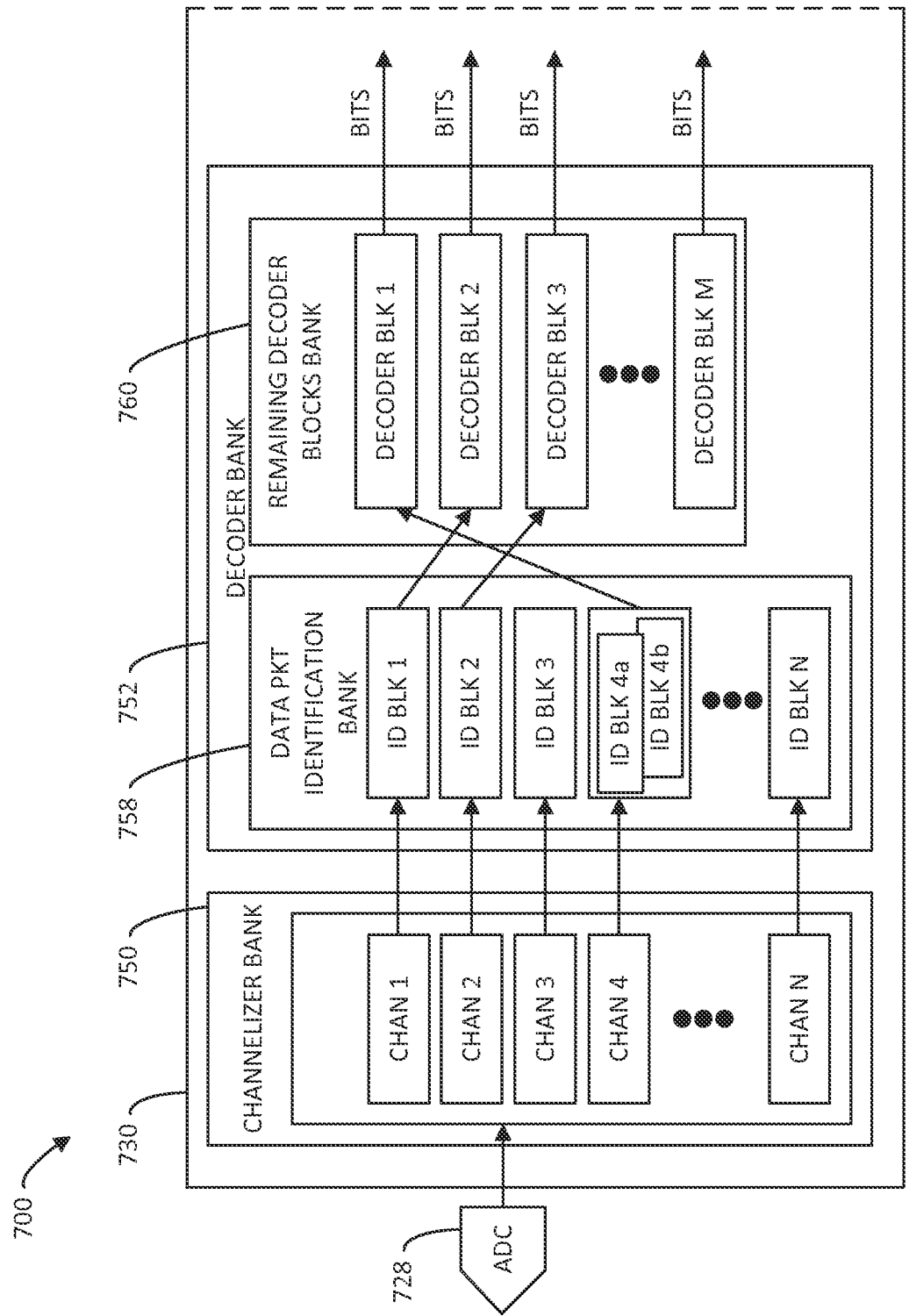
FIGS. 7-9 are block diagrams representative of example implementations of radio receivers with efficient decoder usage, according to embodiments of the present disclosure.
Figure 8:
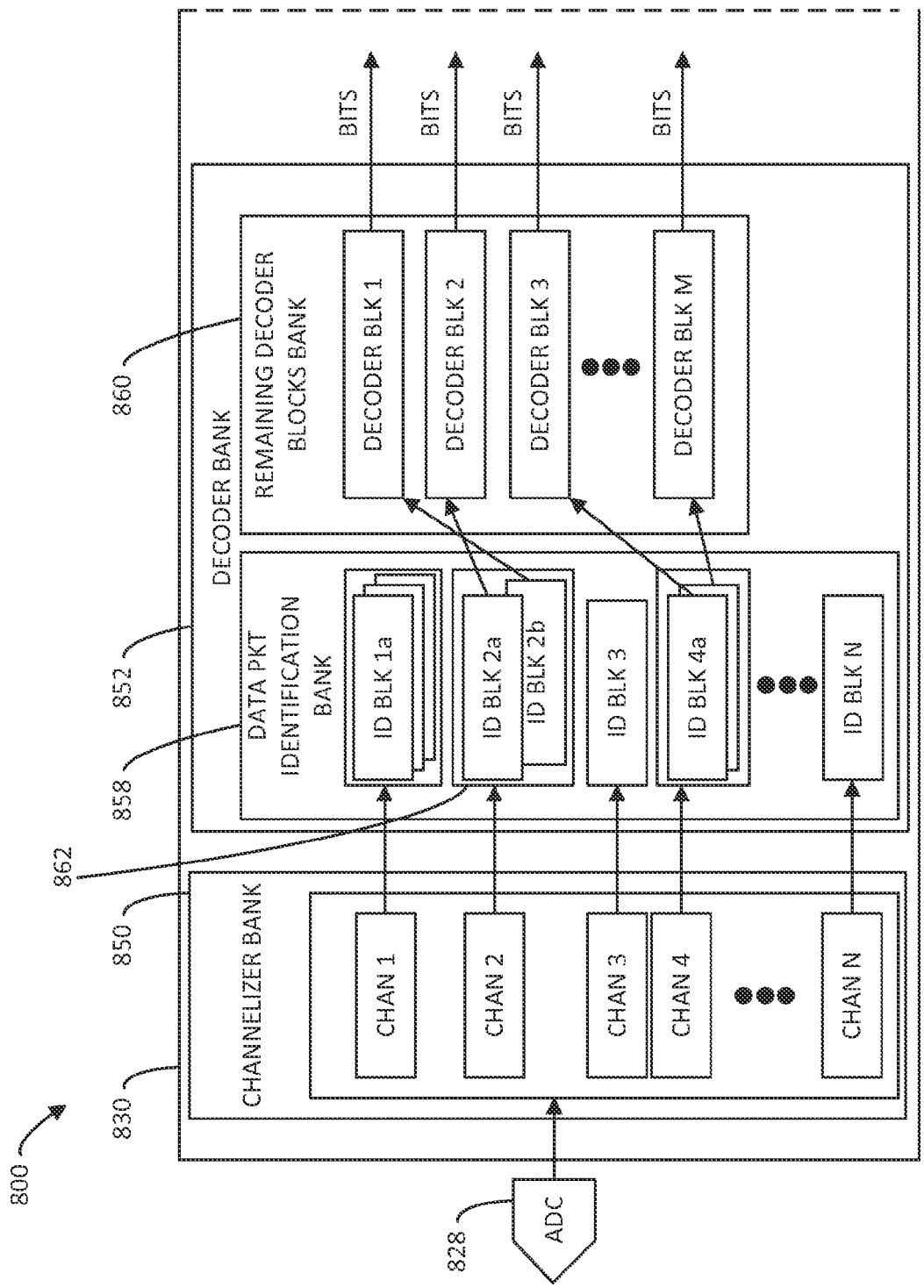
Figure 9:
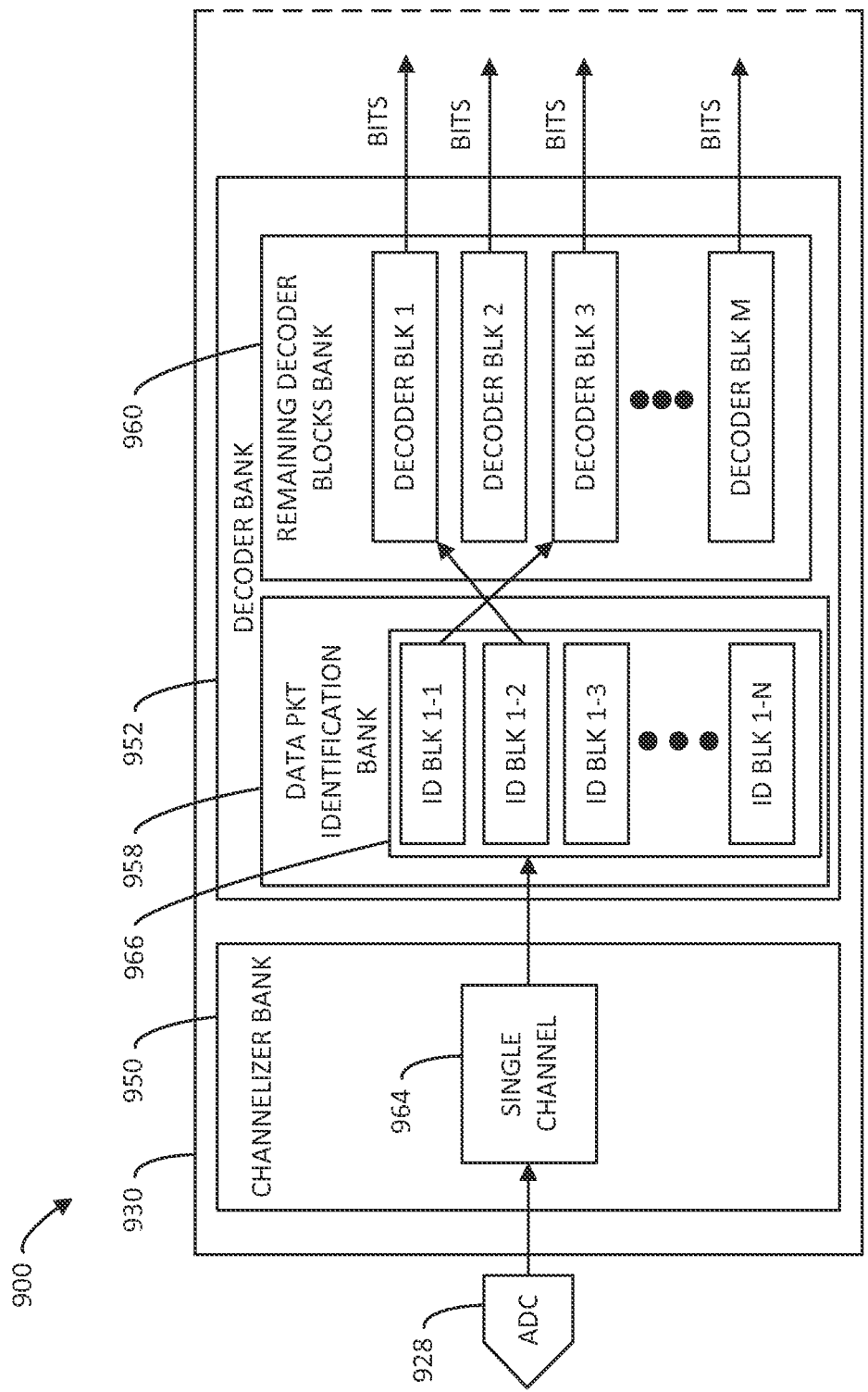

FIGS. 7-9 are block diagrams representative of example implementations of radio receivers with efficient decoder usage, according to embodiments of the present disclosure. As shown in FIG. 7, an example receiver 700 may include an ADC 728 and a logic device 730 (e.g., an FPGA) that may include a channelizer bank 750 and a decoder bank 752. Channelizer bank 750 may include pathway(s) that align with discrete channels 1-N. While these pathways may be implemented as multiple parallel pathways, the receiver embodiments described herein may be implemented as including either true parallel paths, or effectively parallel paths realized by interleaving into a single data path, or both. Decoder bank 752 may comprise two different banks—a data packet identification bank 758 including data packet identification blocks 1-N that correspond to channel pathways 1-N, and a remaining decoder blocks bank 760 that includes decoder blocks 1-M, where M is less than N. In other words, the number of decoder blocks is less than the number of data packet identification blocks, where the number of decoder blocks is optimized. This optimization may be based on one or more goals, including one or more of, for example but not limitation, reduced power consumption, reduced component cost, reduced number of components used, minimized packet loss, etc. The determination of an optimal number M of decoder blocks may be accomplished by analyzing results of a previously run simulation based on parameters relevant to accomplishing the desired goal(s). One example of such a simulation is the simulation described above.

In operation, channelizer bank 750 may channelize and resample a digital signal from ADC 728 into path(s) aligned with discrete channels 1-N. Each channel of channels 1-N may connect to a respective data packet identification block 1-N of data packet identification bank 758 in a one-to-one mapping of channels to identification banks. The data packet identification block (e.g., a sync-word detector) may detect, identify, and ultimately validate a received data packet from the digital signal and provide the validated data packet to an available decoder block of the remaining decoder blocks bank 760. The decoder block may perform one or more decoding functions (e.g., automatic frequency correction (AFC), automatic gain control (AGC), channel filtering, bit detection, data de-whitening, convolutional decoding, etc.), as would be understood by one of ordinary skill in the relevant art. In an embodiment, the decoder functions performed may depend on what is specified in the detected sync-word. Once the decoder block completes its processing, resulting bits and words (e.g., 16-bit words) may be passed to a DSP (not shown), as would be understood by one of ordinary skill in the relevant art, and the decoder block would become available for another validated data packet. It should be noted that in the event that none of the decoder blocks are available to a validated data packet, the data packet may be lost. By optimizing the number of decoder blocks (e.g., via simulation), data packet loss can be minimized. As an example, based on the simulation described above, in which 476 channels were designated, an optimal number of decoder blocks was determined to be 92 (M=92). According to the simulation, this would result in a negligible impact on reliable packet reception with approximately 80% fewer blocks of heavy processing elements in the decoder, greatly reducing both cost and power consumption.

In an embodiment, one or more data packet identification blocks may comprise one or more sub-identification blocks. In the example shown in FIG. 7, ID BLK 4 is comprised of sub-identification blocks ID BLK 4a and ID BLK 4b. Sub-identification blocks may be used for various reasons. For example, sub-identification blocks may be used when more than one sync-word is used to identify and/or classify an incoming data packet. Differing sync-words may be used to provide further information regarding a packet (e.g., to identify a packet, to identify packet priority processing, to define what decoder functionality is needed, etc.). In the example shown in FIG. 7, a single data packet may be identified and/or classified via ID BLKs 4a and 4b and passed onto a decoder block (here, DECODER BLK 1). In an embodiment, the decoder functions performed may depend on what is specified in the detected sync-word(s). In this example, where only one single data packet is validated by a data packet identification block at a time, for optimization purposes, a data packet identification block is counted as one in the count of data packet identification blocks for determining the number of decoder blocks needed, no matter how many sub-identification blocks it may have.

FIG. 8 depicts an example receiver 800 according to an embodiment where one or more data packet identification blocks may comprise one or more sub-identification blocks that may each be able to handle separate data packets simultaneously or in an overlapping manner. In this example, sub-identification blocks may be used to validate one or more packets that come in on a channel in a discrete serial manner as described above, in an overlapping manner, or simultaneously. As shown in FIG. 8, an example receiver 800 may include an ADC 828 and a logic device 830 (e.g., an FPGA) that may include a channelizer bank 850 and a decoder bank 852. Channelizer bank 850 may include pathway(s) that align with discrete channels 1-N. As stated above, while these pathways may be implemented as multiple parallel pathways, the receiver embodiments described herein may be implemented as including either true parallel paths, or effectively parallel paths realized by interleaving into a single data path, or both. Decoder bank 852 may comprise two different banks—a data packet identification bank 858 including data packet identification blocks 1-N that correspond to channel pathways 1-N, and a remaining decoder blocks bank 860 that includes decoder blocks 1-M, where M is less than a total number of sub-identification blocks. In this example, if a data packet identification block comprises just one block, for optimization purposes, it may be considered a single sub-identification block in the count of sub-identification blocks for determining how many decoder blocks are needed. Similar to the embodiment shown in FIG. 7, the number of decoder blocks is less than the number of total sub-identification blocks, where the number of decoder blocks is optimized. This optimization may be based on one or more goals, as discussed above. The determination of an optimal number M of decoder blocks may be accomplished by analyzing results of a previously run simulation based on parameters relevant to accomplishing the desired goal(s), as also discussed above.

In operation, channelizer bank 850 may channelize and resample a digital signal from ADC 828 into path(s) aligned with discrete channels 1-N. Each channel of channels 1-N may connect to a respective data packet identification block 1-N of data packet identification bank 858 in a one-to-one mapping of channels to identification banks. Using channel 2 as an example, channel 2 may connect (and therefore provide a signal, or multiple signals, coming in on channel 2) to data packet identification block 2 (shown as block 862). Data packet identification block 2 in this example comprises two sub-identification blocks 2a and 2b (e.g., sync-word detectors) that may detect, identify, and ultimately validate (e.g., if one of the two sub-identification blocks 2a and 2b recognizes the packet's sync-word) one or two (e.g., overlapping or simultaneously) received data packets from the signal. If a third packet arrives before sub-identification block 2a or 2b finish validating a packet, the third packet may be lost. The validated data packet(s) may be provided to respective available decoder block(s) of the remaining decoder blocks bank 860. In the example shown, each of two validated data packets are respectively provided from ID BLK 2b and ID BLK 2a to DECODER BLK 1 and DECODER BLK 2. DECODER BLKs 1 and 2 may perform one or more decoding functions (e.g., automatic frequency correction (AFC), automatic gain control (AGC), channel filtering, bit detection, data de-whitening, convolutional decoding, etc.), as would be understood by one of ordinary skill in the relevant art. In an embodiment, the decoder functions performed may depend on what is specified in the detected sync-word(s). Once DECODER BLKs 1 and 2 each complete their processing, resulting bits and words (e.g., 16-bit words) may be passed to a DSP (not shown), as would be understood by one of ordinary skill in the relevant art, and DECODER BLKs 1 and 2 would become available for other validated data packets. As noted above, in the event that none of the decoder blocks are available to a validated data packet, the data packet may be lost. By optimizing the number of decoder blocks (e.g., via simulation), data packet loss can be minimized, as discussed previously.

The embodiments shown in FIGS. 7 and 8 are just two examples of receivers including an optimized decoder bank as disclosed herein. Other examples may be contemplated as would be understood by those of ordinary skill in the art after reading this disclosure. For example, embodiments may include combinations of the features described above with reference to FIGS. 7 and 8. As an example of this, in an embodiment, the data packet identification bank may include both data packet identification blocks that are comprised of sub-identification blocks that may validate a single data packet (as described with reference to FIG. 7) and sub-identification blocks that may validate two or more data packets received in a discrete serial manner, overlapping, or simultaneously (as described with reference to FIG. 8). In this embodiment, for optimization purposes, data packet identification blocks that have sub-identification blocks but only validate one single data packet at a time (or do not have any sub-identification blocks) may be counted as one in the determination of how many decoder blocks are needed, while data packet identification blocks that have sub-identification blocks and can validate more than one data packet at a time may count as however many sub-identification blocks it contains (i.e., each sub-identification block counts separately in the determination of how many decoder blocks are needed).

Although the technology discussed in this disclosure is very beneficial in a multi-channel receiver having a high number of channels, it is also useful in optimizing a receiver having as few as one channel. FIG. 9 depicts an example receiver 900 according to an embodiment having only a single channel. As shown in FIG. 9, an example receiver 900 may include an ADC 928 and a logic device 930 (e.g., an FPGA) that may include a channelizer bank 950 (which in this example includes a single channel 964) and a decoder bank 952. Decoder bank 952 may comprise two different banks—a data packet identification bank 958 including a single data packet identification block 966 having data packet sub-identification blocks 1-1 to 1-N, and a remaining decoder blocks bank 960 that includes decoder blocks 1-M, where M is less than a total number of data packet sub-identification blocks. In other words, the number of decoder blocks is less than the number of total data packet sub-identification blocks, where the number of decoder blocks is optimized. This optimization may be based on one or more goals, as discussed above. The determination of an optimal number M of decoder blocks may be accomplished by analyzing results of a previously run simulation based on parameters relevant to accomplishing the desired goal(s), as also discussed above. In this embodiment, multiple signals (i.e., multiple data packets) may be received on a common RF channel without colliding with each other. This embodiment may be useful where there may be a common modulation mode with different spreading factors using orthogonal codes.

In operation, channelizer bank 950 may channelize and resample a digital signal or signals from ADC 928 into a path aligned with channel 964. Channel 964 may connect to data packet identification block 966 of data packet identification bank 958. In this example, channel 964 may connect (and therefore provide one or more data packets coming in on channel 964) to data packet identification block 966. Data packet identification block 966 in this example comprises N sub-identification blocks 1-1 to 1-N (e.g., sync-word detectors) that may detect, identify, and ultimately validate one or more (up to N) data packets received discretely in serial, overlapping, or simultaneously from the signal(s) and provide the validated data packets to one or more respective available decoder blocks of the remaining decoder blocks bank 960. If all N sub-identification blocks are in use and a packet N+1 arrives before sub-identification blocks 1-N finish validating their respective packet, packet N+1 may be lost. In the example shown, validated data packets are provided to DECODER BLK 1 from sub-identification block 1-2 and to DECODER BLK 3 from sub-identification block 1-1. The DECODER BLKs 1,3 may each perform one or more decoding functions (e.g., automatic frequency correction (AFC), automatic gain control (AGC), channel filtering, bit detection, data de-whitening, convolutional decoding, etc.), as would be understood by one of ordinary skill in the relevant art. Once DECODER BLKs 1,3 complete their processing, resulting bits and words (e.g., 16-bit words) may be passed to a DSP (not shown), as would be understood by one of ordinary skill in the relevant art, and each of DECODER BLKs 1,3 would become available for other validated data packets. As noted above, in the event that none of the decoder blocks are available to a validated data packet, the data packet may be lost. By optimizing the number of decoder blocks (e.g., via simulation), data packet loss can be minimized, as discussed previously.

FIGS. 10-13 are flow charts representative of example processes that may be implemented for receiving data packets, according to embodiments of the present disclosure. Method 1000 of FIG. 10 corresponds to the embodiment shown and described with reference to FIG. 7. In method 1000, a data packet may be received at a channel receiver of at least one channel receiver each associated with a channel (block 1002). The data packet may be provided to a data packet identification block (of at least two data packet identification blocks, or of at least one data packet identification block where at least one data packet identification block includes two or more sub-identification blocks) that corresponds to the channel receiver (block 1004). The data packet may be validated at the data packet identification block (block 1006). The validated data packet may be provided to an available decoder block of at least one decoder block capable of performing desired decoding functions (block 1008). The available decoder block the data packet is provided to may be a first available decoder block, for example, that may be determined in any number of ways (e.g., arbitrarily, according to a predetermined order, according to a prioritization algorithm, etc.). The quantity of decoder blocks may be optimized according to one or more goals (e.g., reduced power consumption, reduced component cost, reduced number of components used, minimized packet loss, etc.), such that there are less decoder blocks needed than the number of data packet identification blocks (i.e., a one-to-one correspondence of data packet identification blocks to decoder blocks is not needed). The optimization regarding the number of decoder blocks needed may be determined by, for example, a previously performed simulation. An example of such simulation was provided above.

Figure 11:
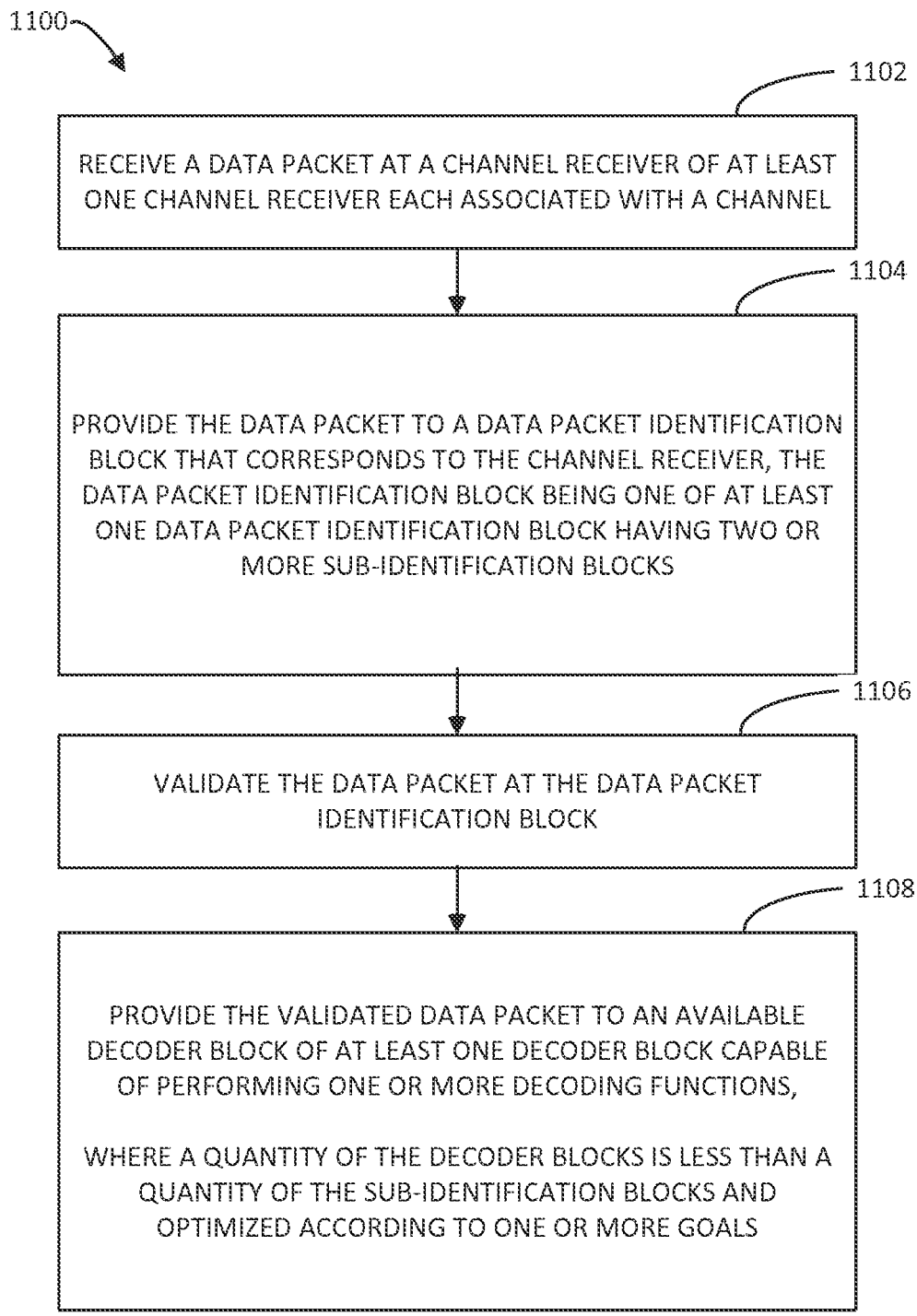

Method 1100 of FIG. 11 corresponds to the embodiment shown and described with reference to FIG. 8. In method 1100, a data packet may be received at a channel receiver of at least one channel receiver each associated with a channel (block 1102). The data packet may be provided to a data packet identification block that corresponds to the channel receiver, the data packet identification block being of at least one data packet identification block where at least one data packet identification block includes two or more sub-identification blocks (block 1104). The data packet may be validated at the data packet identification block (block 1106). The validated data packet may be provided to an available decoder block of at least one decoder block capable of performing desired decoding functions, where a quantity of the decoder blocks is less than a quantity of the sub-identification blocks (block 1108). The available decoder block the data packet is provided to may be a first available decoder block, for example, that may be determined in any number of ways (e.g., arbitrarily, according to a predetermined order, according to a prioritization algorithm, etc.). The quantity of decoder blocks may be optimized according to one or more goals (e.g., reduced power consumption, reduced component cost, reduced number of components used, minimized packet loss, etc.), such that there are less decoder blocks needed than the number of data packet identification blocks (i.e., a one-to-one correspondence of data packet identification blocks to decoder blocks is not needed). The optimization regarding the number of decoder blocks needed may be determined by, for example, a previously performed simulation. An example of such simulation was provided above.

Figure 10:
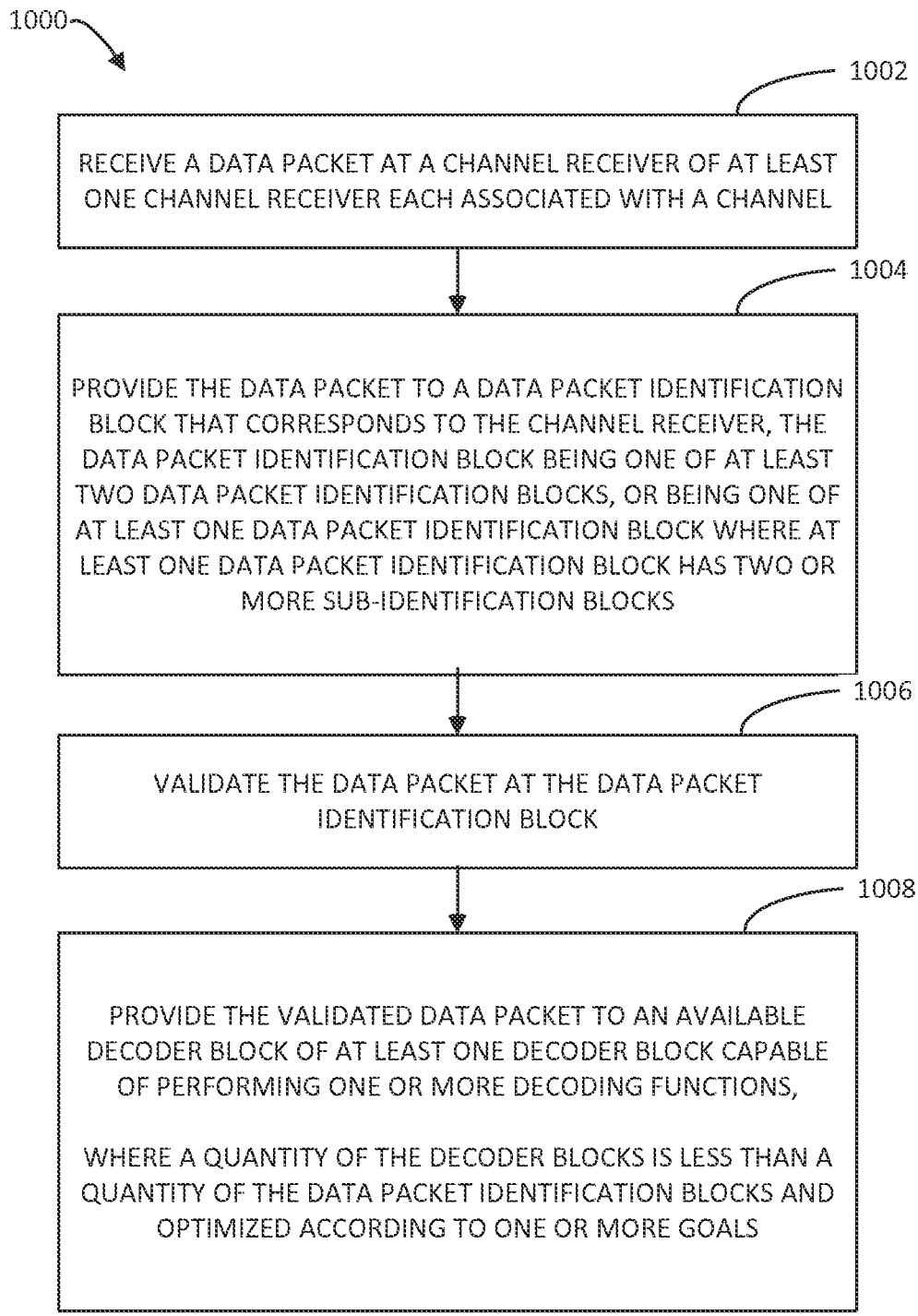
FIGS. 10-13 are flow charts representative of example processes that may be implemented for receiving data packets, according to embodiments of the present disclosure.
Figure 12:
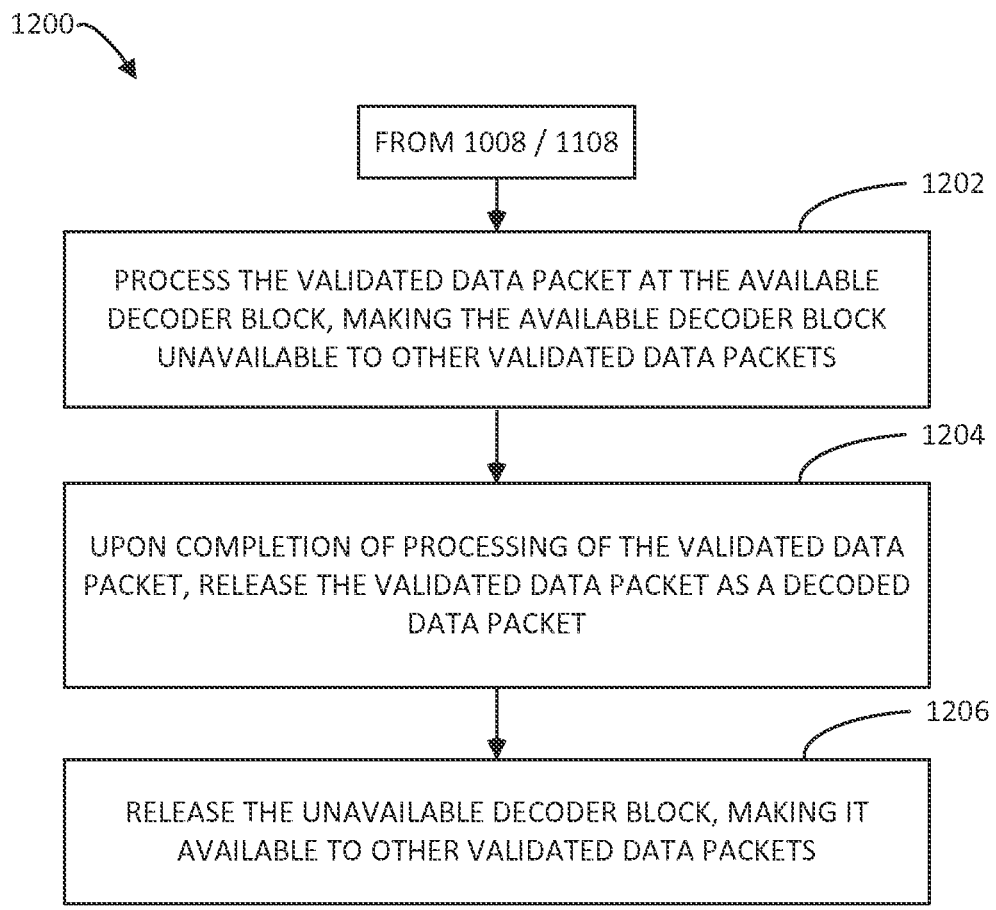

FIG. 12 is a flow diagram 1200 that continues the methodology shown in FIGS. 10 and/or 11, according to an embodiment of the present disclosure. From block 1008 of FIG. 10 or block 1108 of FIG. 11, the validated data packet may be processed at the available decoder block, making the available decoder block unavailable to other validated data packets (block 1202). Upon completion of processing the validated data packet, the validated data packet may be released by the decoder block as a decoded data packet (block 1204). The unavailable decoder block may then be released, making it available to other validated data packets (block 1206).

Figure 13:
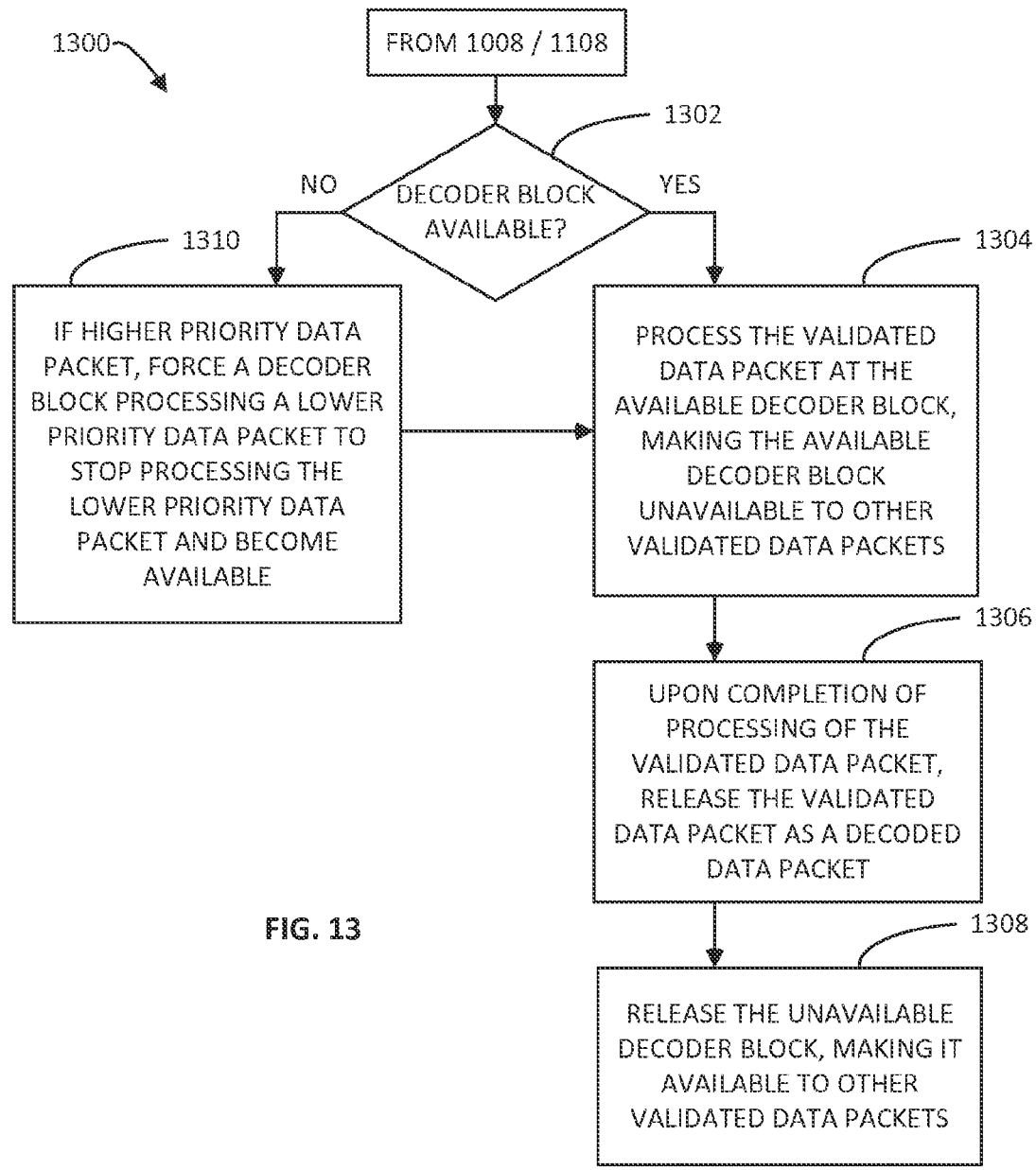

FIG. 13 is a flow diagram 1300 that continues the methodology shown in FIGS. 10 and/or 11, according to an embodiment of the present disclosure. From block 1008 of FIG. 10 or block 1108 of FIG. 11, it may be determined if a decoder block is available (block 1302). If a decoder block is available, the validated data packet may be provided to and processed at the available decoder block, making the available decoder block unavailable to other validated data packets. Upon completion of processing the validated data packet, the validated data packet may be released by the decoder block as a decoded data packet (block 1306). The unavailable decoder block may then be released, making it available to other validated data packets (block 1308). Referring back to block 1302, if a decoder block is not available and the data packet is a higher priority data packet than one or more data packets currently being processed by a decoder block, a decoder block that is processing a lower priority data packet may be forced to stop processing the lower priority data packet and become available (block 1310) to process the higher priority data packet. A data packet may be identified as a higher priority data packet in a number of ways (e.g., its having been received on a higher priority channel, its having preamble (e.g., sync-word) data that includes an indication that the data packet is a higher priority data packet, etc.). For example, in the case of a utility RF system, an endpoint alarm (e.g., an identification of a problem at a utility meter), may use or include a different sync-word than a regular data packet that includes meter reading data, for example. The higher priority alarm packet may "trump" a regular packet in the decoder bank if all of the decoders are being used. In an embodiment, a hierarchy of priority may be used that includes two or more priority levels. Methodology 1300 may continue at block 1304 with the now available decoder block to process the higher priority data packet instead.

In an embodiment, all of the decoder blocks may have identical decoding functionality (e.g., a superset of functionality), and it would not matter which decoder block was to process a validated data packet because any of them may be used. In an alternative embodiment, one or more decoder blocks may be capable of having one or more functions enabled or disabled depending on the packet. The enabling or disabling of decoder block functionality for a specific packet may be indicated based on, for example, the channel on which the packet came in, an indication in a packet's sync-word, etc.

In another alternative embodiment, one or more decoder blocks may be capable of performing one or more different sets of decoding functions than one or more other decoder blocks, and the determination to which decoder block to provide a validated data packet may depend on which functions each decoder block may be capable of performing. Using the implementation shown in FIG. 7 as an example (though this may apply to any of the implementations/configurations described herein), assume that a data packet coming in through a certain channel (e.g., channel 4), and/or having an indication in its sync-word, may require a decoding function that only decoder blocks 5-10 (not explicitly shown) can provide. In this example, when that data packet is received via channel 4, and identified at data packet identification block 4, its pool of possible decoder blocks may be determined to be limited to decoder blocks 5-10, even if any of decoder blocks 1-4 and 11-N are available. Limiting the decoder functionality of the decoder blocks may further reduce power consumption and/or component cost, though at a cost of reduced availability and possible loss of packets. Determining an efficient configuration of decoder blocks and their functionality capabilities may be accomplished using a previously conducted simulation, depending on needs and/or goals.

One or more features disclosed herein may be implemented in hardware, software, firmware, and/or combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 14:
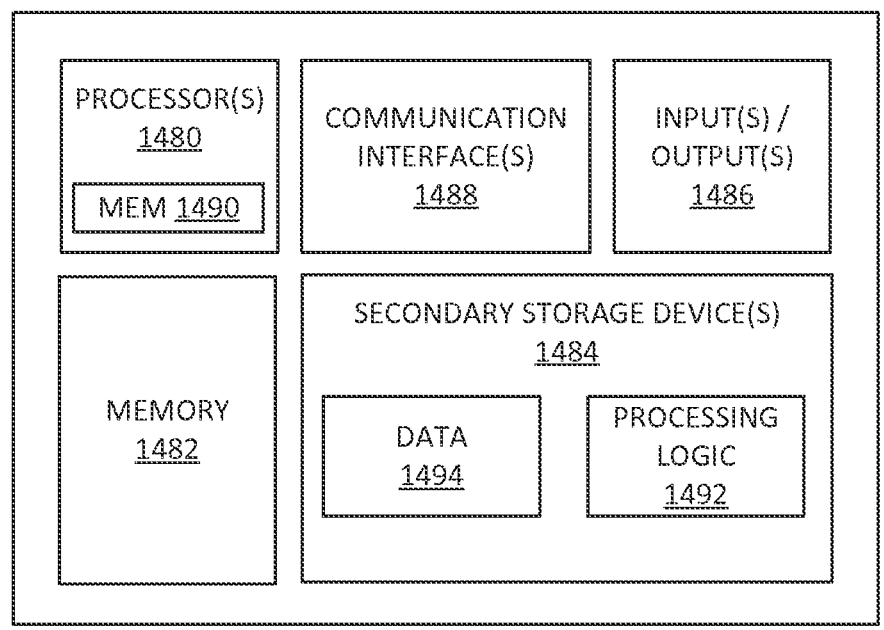
FIG. 14 is a block diagram of an example processing system capable of executing the example methodology of FIGS. 10-13 to implement the example radio receivers of FIGS. 7-9, according to embodiments of the present disclosure.

FIG. 14 is a block diagram of a processing platform 1400 that may be capable of controlling a receiver, such as the receivers shown in FIGS. 7, 8, and 9, according to embodiments of this disclosure. The processing platform may be embodied in any type of mobile or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, etc. Examples of non-mobile devices may include, but are not to be limited to, servers, personal computers (PCs), Internet appliances, televisions, smart televisions, data communication devices, media playing devices, gaming consoles, etc. For example, processing platform 1400 may be embodied in the data collector 106 of FIG. 1. Similar processing platforms may be embodied in endpoints 108-120, the computing devices at central office 102, and/or a mobile collection device.

Processing platform 1400 may include one or more processors 1480, memory 1482, one or more secondary storage devices 1484, one or more input/output devices 1486, and/or one or more communication interfaces 1488, in communication via a bus, line, or similar implementation (not shown). Processor(s) 1480 may be implemented by, for example but not limitation, one or more integrated circuits, logic circuits, microprocessors, controllers, etc. Processor(s) 1480 may include a local memory 1490 (e.g., a cache). Memory 1482 may include a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 1482 may be controlled by a memory controller (not shown). Data stored in local memory 1490 and/or memory 1482 may be used by processor(s) 1480 to facilitate the controlling of a receiver, such as the receivers shown in FIGS. 7, 8, and 9, according to embodiments of this disclosure.

Input/output devices 1486 may allow a user to interface with processor(s) 1480. Input devices may allow a user to enter data and/or commands for processor(s) 1480. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output devices 1486 may be connected to processor(s) 1480, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1488 may be implemented in hardware or a combination of hardware and software, and may provide wired or wireless network interface(s) to one or more networks, such as network(s) 104 of FIG. 1. Communication interface(s) 1488 may be a part of, or connected with, the interface circuit discussed above, and/or may include or connect with communication devices such as a transmitter, a receiver, a transceiver, a modem and/or network interface card to facilitate exchange of data with external devices (e.g., computing devices of any kind) via a network, such as the RF network described in this disclosure.

Secondary storage device(s) 1484 may store processing logic 1492 (e.g., software) to be executed by processor(s) 1480 and/or data 1494. Processing logic 1492 and data 1494 may be used by processor(s) 1480 to facilitate the controlling of a receiver, such as the receivers shown in FIGS. 7, 8, and 9, according to embodiments of this disclosure. Processing logic 1492 may include instructions for executing the methodology shown in FIGS. 10-13, for example. Examples of secondary storage device(s) 1484 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1484.

The technology disclosed herein allows for a large multi-channel receiver to be efficiently implemented with minimal to no data packet loss while significantly reducing the use of expensive components (e.g., FPGA resources, etc.), reducing the number of components (and also the space needed for them), and reducing power dissipation. This is accomplished by optimizing the decoder bank and how it is used. The disclosed architectures provide designs scalable depending on desired goals (e.g., minimized data packet loss, component cost savings, power savings, space savings, etc.). The goals discussed herein are just a few examples of the many goals that may be contemplated and effected using the disclosed technology.

The particular examples and scenarios used in this document are for ease of understanding and are not to be limiting. Though described for use with data collection in utility metering, features described herein may be used in many other contexts and situations that may or may not involve data collection or utility metering. For example, the features discussed herein may be beneficial in many other contexts in which receivers are used (e.g., telecommunications networks, mobile device networks, cellular networks, satellite networks, computer networks, broadcasting networks, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A radio receiver configured to receive data packets, comprising:
   a channelizer bank of at least one channel receiver each associated with a channel configured to receive an incoming data packet; and
   a decoder bank comprising:
      a data packet identification bank comprising at least two data packet identification blocks, or comprising at least one data packet identification block with at least one data packet identification block comprising two or more sub-identification blocks, each data packet identification block associated with a corresponding channel to validate an incoming data packet received on the corresponding channel; and a decoder block bank comprising at least one decoder block, each decoder block capable of performing one or more decoding functions, and a quantity of the decoder blocks being less than a quantity of the data packet identification blocks and optimized toward one or more goals, wherein a data packet validated by any one of the at least one data packet identification blocks is to be provided to an available one of the at least one decoder blocks for further decoding.

2. The radio receiver of claim 1, wherein the data packet identification bank comprises at least one data packet identification block having two or more sub-identification blocks, and each sub-identification block is configured to count separately in the quantity of data packet identification blocks for optimization purposes.

3. The radio receiver of claim 2, wherein the channelizer bank includes a single channel receiver, and wherein the data packet identification bank comprises a single data packet identification block having two or more sub-identification blocks.

4. The radio receiver of claim 1, wherein if no decoder block is available to perform one or more decoding functions and the validated data packet is a higher priority data packet than one or more data packets being processed in the decoder block bank, a decoder block processing a lower priority data packet is forced to stop processing the lower priority data packet and process the higher priority data packet.

5. The radio receiver of claim 4, wherein the validated data packet is identified as at least one of:
a higher priority data packet due to having been received on a higher priority channel, or
a higher priority data packet based on priority data found in its preamble when validated at the data packet identification bank.

6. The radio receiver of claim 1, wherein the quantity of decoder blocks is based on one or more parameters depending on the one or more goals.

7. The radio receiver of claim 6, wherein the one or more goals includes one or more of minimizing data packet loss, using less parts, using lower cost parts, or consuming less power.

8. The radio receiver of claim 6, wherein the one or more parameters include one or more of: number of endpoint devices, number of channels, transmission packet length, bubble-up rate, or time dithering value.

9. The radio receiver of claim 6, wherein the quantity of decoder blocks is predetermined by a previously conducted simulation using one or more of the parameters.

10. A method of receiving data packets, the method comprising:
receiving a data packet at a channel receiver of at least one channel receiver each associated with a channel;
providing the data packet to a data packet identification block that corresponds to the channel receiver, the data packet identification block being one of at least two data packet identification blocks in a data packet identification bank, or being one of at least one data packet identification block in the data packet identification bank with at least one data packet identification block comprising two or more sub-identification blocks;
validating the data packet at the data packet identification block; and
providing the validated data packet to an available decoder block of at least one decoder block capable of performing one or more decoding functions, wherein a quantity of the decoder blocks is less than a quantity of the data packet identification blocks and optimized according to one or more goals.

11. The method of claim 10, wherein at least one data packet identification block includes two or more sub-identification blocks, and each sub-identification block is configured to count separately in the quantity of data packet identification blocks for optimization purposes.

12. The method of claim 11, wherein the at least one channel receiver includes a single channel receiver, and wherein the data packet identification block bank includes a single data packet identification block having two or more sub-identification blocks.

13. The method of claim 10, further comprising:
processing the validated data packet at the available decoder block, making the available decoder block unavailable to other validated data packets;
upon completion of processing of the validated data packet, releasing the validated data packet as a decoded data packet; and
releasing the unavailable decoder block, making it available to other validated data packets.

14. The method of claim 13, wherein validating the data packet includes determining whether the data packet is a higher priority data packet than one or more data packets being processed by a decoder block, and wherein the method further comprises:
if no decoder block is available to perform one or more decoding functions and the validated data packet is a higher priority data packet than one or more data packets being processed by a decoder block, forcing a decoder block processing a lower priority data packet to stop processing the lower priority data packet and process the higher priority data packet.

15. The method of claim 10, wherein the quantity of the decoder blocks is based on one or more parameters, the one or more parameters including one or more of: number of endpoint devices, number of channels, transmission packet length, bubble-up rate, or time dithering value.

16. The method of claim 15, wherein the quantity of decoder blocks is predetermined by a previously conducted simulation using one or more of the parameters.

17. At least one non-transitory computer-readable medium having computer program logic stored thereon, the computer program logic including instructions to cause a processor to direct a radio receiver to:
receive a data packet at a channel receiver of at least one channel receiver each associated with a channel;
provide the data packet to a data packet identification block that corresponds to the channel receiver, the data packet identification block being one of at least two data packet identification blocks in a data packet identification bank, or being one of at least one data packet identification block in the data packet identification bank with at least one data packet identification block comprising two or more sub-identification blocks;
validate the data packet at the data packet identification block; and
provide, for further decoding, the validated data packet to an available decoder block of at least one decoder block capable of performing one or more decoding functions, wherein a quantity of the decoder blocks is less than a quantity of the data packet identification blocks and optimized according to one or more goals.

18. The at least one computer readable medium of claim 17, wherein at least one data packet identification block includes two or more sub-identification blocks, and each sub-identification block is configured to count separately in the quantity of data packet identification blocks for optimization purposes.

19. The at least one computer readable medium of claim 18, wherein the at least one channel receiver includes a single channel receiver, and wherein the data packet identification block bank includes a single data packet identification block having two or more sub-identification blocks.

20. The at least one computer readable medium of claim 17, wherein the instructions further include instructions to cause the processor to direct the radio receiver to:
   process the validated data packet at the available decoder block, making the available decoder block unavailable to other validated data packets;
   upon completion of processing of the validated data packet, release the validated data packet as a decoded data packet; and
   release the unavailable decoder block, making it available to other validated data packets.

21. The at least one computer readable medium of claim 20, wherein validating the data packet includes determining whether the data packet is a higher priority data packet than one or more data packets being processed by a decoder block, and wherein the instructions further include instructions to cause the processor to:
   if no decoder block is available to perform one or more decoding functions and the validated data packet is a higher priority data packet than one or more data packets being processed by a decoder block, force a decoder block processing a lower priority data packet to stop processing the lower priority data packet and process the higher priority data packet.

22. The at least one computer readable medium of claim 17, wherein the quantity of the decoder blocks is based on one or more parameters, the one or more parameters including one or more of: number of endpoint devices, number of channels, transmission packet length, bubble-up rate, or time dithering value.

23. The at least one computer readable medium of claim 22, wherein the quantity of decoder blocks is predetermined by a previously conducted simulation using one or more of the parameters.

24. A radio receiver for receiving data packets, comprising:
   a channel receiver associated with a channel for receiving incoming data packets, the incoming data packets representative of one or more signals coming in on the channel; and
   a decoder bank comprising:
      a data packet identification block associated with the channel, the data packet identification block having two or more sub-identification blocks to validate incoming data packets received on the channel; and
      a decoder block bank comprising at least one decoder block, each decoder block capable of performing one or more decoding functions, and a quantity of the decoder blocks being less than a quantity of the sub-identification blocks and optimized toward one or more goals,
   wherein each of one or more validated data packets is to be provided from its respective sub-identification block to an available one of the at least one decoder block for further decoding.

* * * * *